United States Patent
Ahmed et al.

(10) Patent No.: US 9,667,390 B2
(45) Date of Patent: May 30, 2017

(54) TIME-DOMAIN MECHANISM FOR COMPUTING ERROR VECTOR MAGNITUDE OF OFDM SIGNALS

(71) Applicant: NATIONAL INSTRUMENTS CORPORATION, Austin, TX (US)

(72) Inventors: I. Zakir Ahmed, Bangalore (IN); Craig E. Rupp, Ames, IA (US); Ramanujeya Lakshminarayan Narahari, Bangalore (IN)

(73) Assignee: NATIONAL INSTRUMENTS CORPORATION, Austin, TX (US)

( * ) Notice: Subject to any disclaimer, the term of this patent is extended or adjusted under 35 U.S.C. 154(b) by 106 days.

(21) Appl. No.: 14/255,046

(22) Filed: Apr. 17, 2014

(65) Prior Publication Data

US 2015/0304075 A1    Oct. 22, 2015

(51) Int. Cl.
*H04L 1/20* (2006.01)
*H04L 27/26* (2006.01)

(52) U.S. Cl.
CPC .............. *H04L 1/203* (2013.01); *H04L 1/206* (2013.01); *H04L 27/2637* (2013.01)

(58) Field of Classification Search
None
See application file for complete search history.

(56) References Cited

U.S. PATENT DOCUMENTS

| 2006/0072524 | A1* | 4/2006 | Perahia | H04L 25/022 370/338 |
| 2007/0070881 | A1* | 3/2007 | Olgaard | H04L 1/242 370/208 |

(Continued)

OTHER PUBLICATIONS

Li et al., A Novel Measurement of Error Vector Magnitude for TD-LTE Termination, Oct. 20012, IEEE.*

(Continued)

*Primary Examiner* — Wednel Cadeau
(74) *Attorney, Agent, or Firm* — Meyertons Hood Kivlin Kowert & Goetzel, P.C.; Jeffrey C. Hood; Mark K. Brightwell

(57) ABSTRACT

A mechanism for determining an error vector magnitude $EVM_{TD}$ for a signal transmitted by a device under test (DUT). A receiver (typically an RF signal analyzer) produces a baseband signal in response to the signal transmission. An OFDM input signal (derived from the baseband signal) is accessed from memory. The OFDM input signal includes a sequence of time-domain OFDM input symbols. A reference signal is accessed from the memory. The reference signal includes a sequence of time-domain OFDM reference symbols. $EVM_{TD}$ is computed in the time domain based on a time-domain difference signal, i.e., a time-domain difference between the sequence of time-domain OFDM input symbols and the sequence of time-domain OFDM reference symbols. The error vector magnitude $EVM_{TD}$ is determined without transforming the sequence of time-domain OFDM input symbols to the frequency domain. The error vector magnitude $EVM_{TD}$ is related to a standard-defined composite EVM by a scalar multiple.

20 Claims, 7 Drawing Sheets

(56) References Cited

U.S. PATENT DOCUMENTS

| | | | |
|---|---|---|---|
| 2012/0082262 A1* | 4/2012 | Janani | H04L 27/2624 |
| | | | 375/296 |
| 2012/0109548 A1* | 5/2012 | Asami | H04L 27/364 |
| | | | 702/58 |
| 2014/0040668 A1 | 2/2014 | Rupp et al. | |

OTHER PUBLICATIONS

Li et al., a Novel Measurement of Error Vector Magnitude for TD-LTE Termination, Oct. 2012, IEEE.*

Li et al. , A Novel Measurement of Error Vector Magnitude for TD-LTE Termination, Oct. 20012, IEEE.*

Li, Xiaowen; Peng, Deyi; Wang, Guozhong; A Novel Measurement of Error Vector Magnitude for TD-LTE Termination; 2012 5th Annual International Congress on Image and Signal Processing (CISP); Oct. 16-18, 2012; pp. 1745-1749; IEEE; Chongqing, Sichuan, China.

Schmogrow, Rene; et al; Error Vector Magnitude as a Performance Measure for Advanced Modulation Formats; IEEE Photonics Technology Letters; Jan. 1, 2012; pp. 61-63; vol. 24, No. 1; IEEE.

Halder, Achintya; Chatterjee, Abhijit; Low-Cost Alternative EVM Test for Wireless Receiver Systems; Proceedings of the 23rd IEEE VLSI Test Symposium; May 1-5, 2005; pp. 255-260; IEEE.

National Instruments Corporation; Vector Signal Analyzer—NI PXIe5663, NI PXIe-5663E; Jan. 2010; 8 pages.

National Instruments Corporation; Vector Signal Generator—NI PXIe5673, NI PXIe-5673E; Aug. 2010; 9 pages.

ETSI TS 136 521-1 V8.0.1 (Jan. 2009) Technical Specification; LTE; Evolved Universal Terrestrial Radio Access (E-UTRA); User Equipment (UE) conformance specification; Radio transmission and reception; Part 1: conformance testing3; GPP TS 36.521-1 version 8.0.1 Release 8; Jan. 2009; 171 pages.

ETSI TS 136 141 V8.3.0 (Jul. 2009) Technical Specification; LTE; Evolved Universal Terrestrial Radio Access (E-UTRA); Base Station (BS) conformance testing; 3GPP TS 36.141 version 8.3.0 Release 8; Jul. 2009; 151 pages.

* cited by examiner

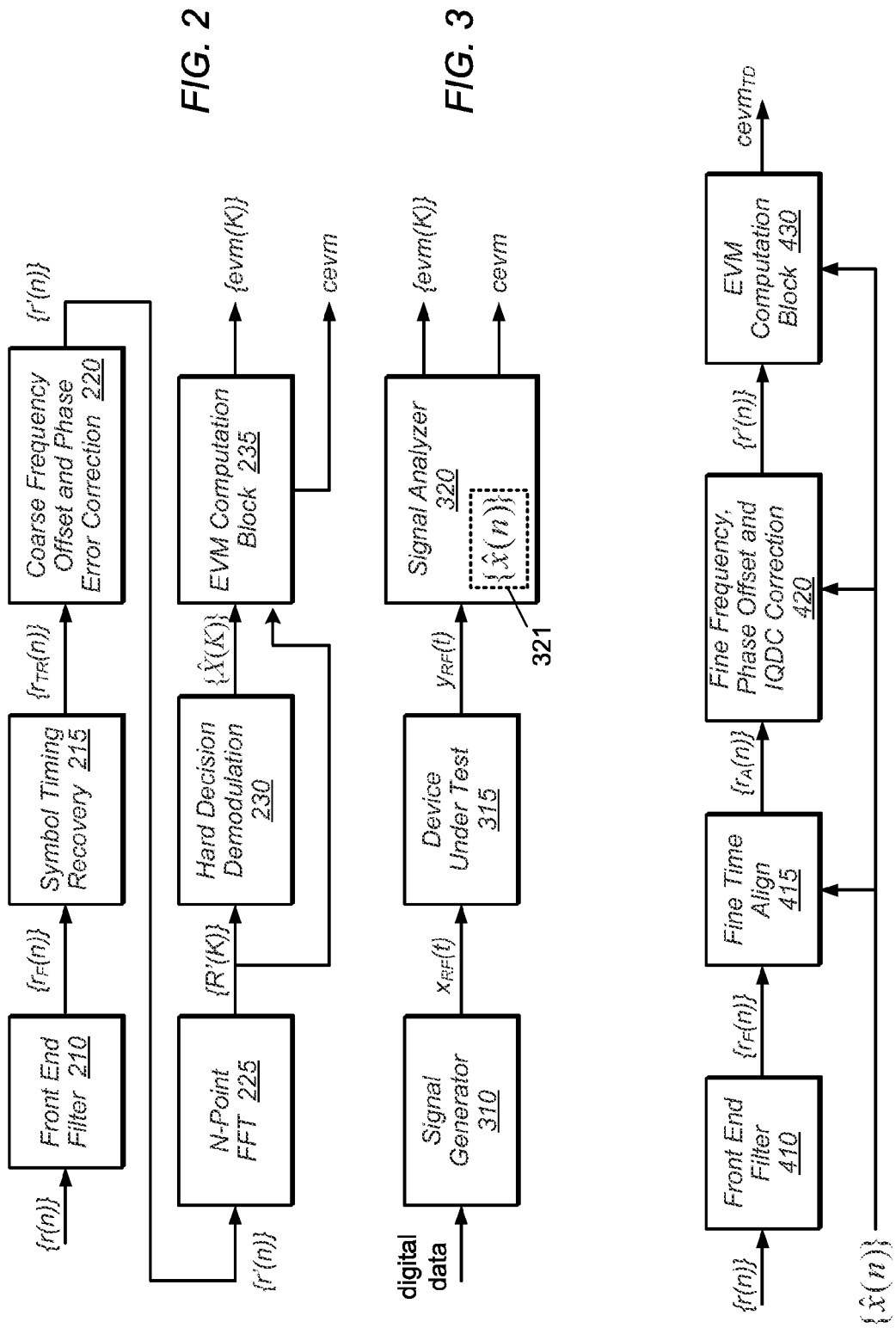

| Signal Configuration | Average of ratio cevm/cevm$_{TD}$ for SNR ranging from 35dB to 60dB in steps of 0.25dB | Expected Ratio |
|---|---|---|
| 20Mhz | 0.74023399 | $0.76546554 = \sqrt{\dfrac{1200}{2048}}$ |
| 15Mhz | 0.64127134 | $0.66291261 = \sqrt{\dfrac{900}{2048}}$ |
| 10Mhz | 0.53038920 | $0.54126588 = \sqrt{\dfrac{600}{2048}}$ |

FIG. 6
(Table 1)

| Signal Configuration | T1/T2 (Speed) |
|---|---|
| 20Mhz | 16.804652 |
| 15Mhz | 16.961436 |
| 10Mhz | 16.450363 |

FIG. 7
(Table 2)

TIME-DOMAIN MECHANISM FOR COMPUTING ERROR VECTOR MAGNITUDE OF OFDM SIGNALS

FIELD OF THE INVENTION

The present invention relates to the field of transmitter testing, and more particularly, to a mechanism for efficiently determining an error vector magnitude using time-domain computations, i.e., an error vector magnitude for an orthogonal frequency-divisional multiplexing (OFDM) signal transmitted from a device under test (DUT) such as a mobile device, power amplifier, etc.

DESCRIPTION OF THE RELATED ART

When testing a transmitter (e.g., mobile device), the transmitter may be connected to an RF signal analyzer. An RF signal transmitted from the transmitter is captured using the RF signal analyzer. The RF signal analyzer produces a baseband signal corresponding to the captured RF signal. An error vector magnitude (EVM) of the transmitted signal may be determined by comparing the baseband signal to a reference signal. Where the transmitted signal is an OFDM signal, conventional methods for computing error vector magnitude involve transforming the baseband signal and the reference signal to the frequency domain, and comparing the two transformed signals.

In other situations, the device under test (DUT) may be an RF power translating device such as a power amplifier (PA). In these situations, the DUT may be connected between an RF signal generator and an RF signal analyzer. The RF signal generator supplies an RF signal (that carries an OFDM signal) to the power translating device. The power translating device operates on the RF signal to produce an RF output signal. The RF signal analyzer captures the RF output signal and produces a baseband signal. Again, conventional methods for computing error vector magnitude dictate transforming the baseband signal and a corresponding reference signal to the frequency domain, and comparing the two transformed signals. Here the EVM characterizes the quality of the RF output signal from the power translating device.

As noted above, the EVM computation uses a reference signal. The reference signal may be computed from the baseband signal produced by the RF signal analyzer. In some contexts, the EVM computation may rely on a previously stored reference signal. For example, prior to the EVM computation, the signal analyzer may receive the reference signal from the mobile device under test (or from the signal generator in the case where an RF power-translating device is being tested), and store the reference signal in memory for use by the EVM computation.

It is typical to subject a DUT to a plurality of test iterations, and to compute the EVM for each of the iterations so that the average EVM for the RF signals transmitted from the DUT may be determined. The total time required to test the DUT thus depends on the efficiency of the EVM computation technique. Any improvement in this efficiency will decrease testing time and increase the number of DUTs that can be evaluated per unit time.

In another test scenario, a receiver under test (e.g., a receiver in a mobile device) generates a baseband signal in response to the transmission of an RF signal by an RF signal generator. The transform of the baseband signal may be compared to the transform of a corresponding reference signal (e.g., a previously-stored reference signal) in order to determine an EVM that characterizes the quality of the analog front-end processing of the receiver under test. Again, any improvement in the efficiency of the EVM computation will result in an increase in the number of receivers that can be evaluated per unit time.

SUMMARY

In one set of embodiments, a method for determining an error vector magnitude $EVM_{TD}$ for an analog OFDM signal (e.g., an RF signal) transmitted from a device under test (DUT) may include the following operations. The subscript "TD" is meant to imply that the error vector magnitude is computed in the time domain. OFDM is an acronym for "orthogonal frequency-division multiplexing".

An OFDM input signal is accessed from memory, where the OFDM input signal includes a sequence of time-domain OFDM input symbols. The OFDM input signal may be derived from a baseband signal produced by a receiver (e.g., an RF signal analyzer) in response to a transmission of the analog OFDM signal (e.g., an RF OFDM signal) from the device under test. The OFDM input signal may be the result of a series of one or more correction operations applied to the baseband signal, e.g., as variously described herein.

A reference signal is accessed from the memory, wherein the reference signal includes a sequence of time-domain OFDM reference symbols. (Each of the OFDM reference symbols comprises a vector of time-domain samples.) The reference signal may be derived from the received baseband signal by means well known in the art of signal processing.

The error vector magnitude $EVM_{TD}$ may be computed in the time domain. For example, the error vector magnitude $EVM_{TD}$ may be computed based on a time-domain difference signal, where the time-domain difference signal is a time-domain difference between the sequence of time-domain OFDM input symbols and the sequence of time-domain OFDM reference symbols. The error vector magnitude $EVM_{TD}$ is determined without transforming the sequence of time-domain OFDM input symbols to the frequency domain. (In other words, so far as the presently-disclosed EVM computation is concerned, the OFDM input symbols do not need to be transformed to the frequency domain.) The error vector magnitude $EVM_{TD}$ is related to a standard-defined composite EVM by a scalar multiple.

The error vector magnitude $EVM_{TD}$ may be stored in memory.

In some embodiments, the method may include displaying a visual representation of the error vector magnitude $EVM_{TD}$ using a display device.

In some embodiments, the method may include declaring that the DUT has passed or failed a quality test based on the error vector magnitude $EVM_{TD}$ (or alternatively, based on an average of $EVM_{TD}$ over a plurality of test iterations).

BRIEF DESCRIPTION OF THE DRAWINGS

A better understanding of the present inventions can be obtained when the following detailed description is considered in conjunction with the following drawings.

FIG. 2 illustrates one embodiment of a method for computing subcarrier EVMs and composite EVM for an OFDM signal (e.g., an LTE downlink signal). EVM(k) denotes the error vector magnitude for the $k^{th}$ subcarrier, and cevm denotes the composite error vector magnitude. (LTE is an acronym for "Long Term Evolution".)

FIG. 3 illustrates one embodiment of a test setup for RF component validation and/or characterization.

FIG. 4 illustrates one embodiment of a method for computing a time-domain EVM for an OFDM signal (e.g., an LTE downlink signal).

FIG. 6 is a table showing the average value of the ratio $cevm/cevm_{TD}$ for LTE uplink signal with bandwidths 20 MHz, 15 MHz and 10 MHz configurations over 100 runs with SNRs ranging from 30 dB to 60 dB in steps of 0.25 dB. The third column gives the ratio expected based on the theoretically derived expression: ratio=$(M/N)^{1/2}$.

FIG. 7 is a table showing the ratio T1/T2 for 20 MHz, 15 MHz and 10 MHz configurations, where T1 is the time consumed for computing the composite EVM (cevm) using the traditional approach, and T2 is the time consumed for computing the composite EVM ($cevm_{TD}$) using one embodiment of the presently-disclosed method.

Figure 1:
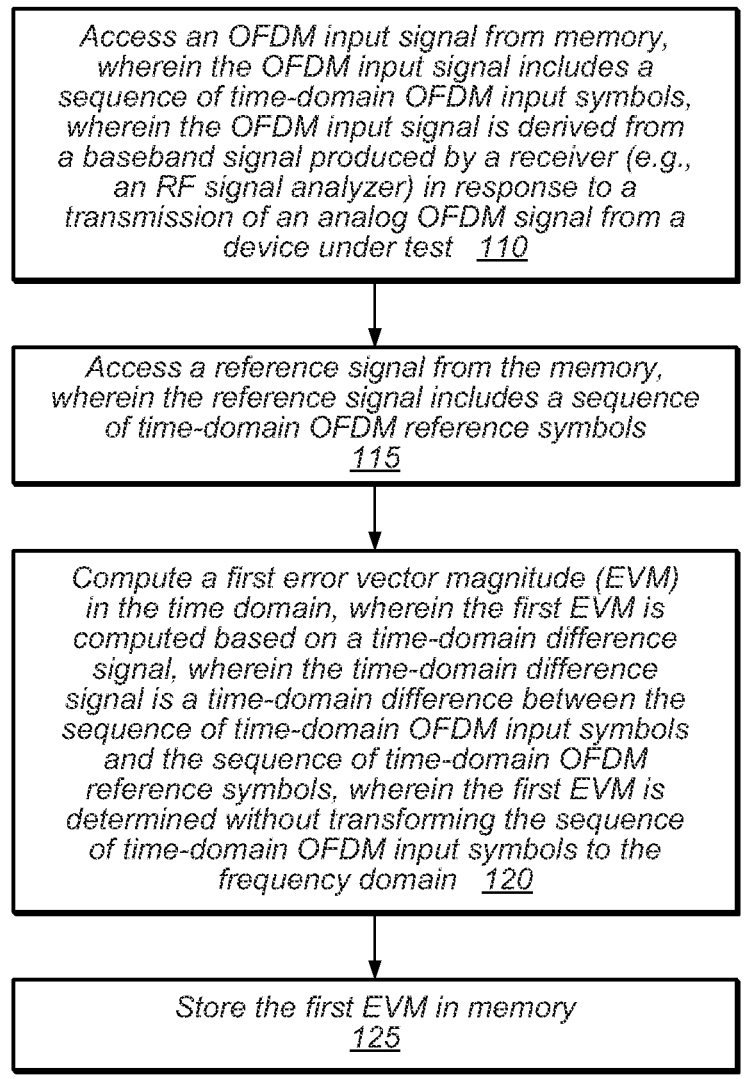
FIG. 1 illustrates one embodiment of a method for determining a time-domain error vector magnitude for an RF signal transmitted from a device under test.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. Note that the various section headings in the following Detailed Description are for organizational purposes only and are not meant to be used to limit the claims.

DETAILED DESCRIPTION OF THE EMBODIMENTS

Terminology

The following is a glossary of terms used in the present application.

Memory medium—A memory medium is a non-transitory medium configured for the storage and retrieval of information. Examples of memory media include: various kinds of semiconductor-based memory such as RAM and ROM (including static RAM and dynamic RAM of various kinds, and PROM, EPROM, EEPROM and flash memory of various kinds); various kinds of magnetic media such as magnetic disk, tape, strip and film; various kinds of optical media such as CD-ROM, DVD-ROM and holographic media; various media based on the storage of electrical charge and/or any of a wide variety of other physical quantities; media fabricated using various lithographic techniques; etc. The term "memory medium" includes within its scope of meaning the possibility that a given memory medium might be a union of two or more memory media that reside at different locations, e.g., on different chips in a system or on different computers in a network. A memory medium is typically computer-readable, e.g., is capable of being read by a computer.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a computer system may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a tablet computer, a wearable computer, etc.

In some embodiments, a set of computers distributed across a network may be configured to partition the effort of executing a computational method (e.g., any of the method embodiments disclosed herein).

Fast and Efficient Computation of Error Vector Magnitude

In one set of embodiments, a method 100 for computing error vector magnitude may include the operations shown in FIG. 1. The method 100 may be used to compute error vector magnitude for an analog OFDM signal (e.g., an OFDM-carrying RF signal) transmitted by a device under test DUT. (The method 100 may also include any subset of the features, elements and embodiments described below in connection with FIGS. 3-8.) The method 100 may be performed by digital circuitry, e.g., by a processor in response to the execution of stored program instructions, by a programmable hardware element such as an FPGA, by dedicated circuitry such as an ASIC, or by any combination of the foregoing.

In some embodiments, the DUT may be a transmitter, e.g., a transmitter of a mobile device or user equipment (UE) device such as a mobile phone, media player, tablet computer, etc. The transmitter may generate the RF OFDM signal based on digital data provided by a test controller. In other embodiments, the DUT may be a power-translating device (such as a power amplifier). The power-translating device may receive a test signal (i.e., an OFDM-carrying RF test signal) from an RF signal generator, and responsively output the RF OFDM signal. (The RF signal generator may generate the test signal based on digital data provided by a test controller.)

At 110, the digital circuitry may access an OFDM input signal from memory. The OFDM input signal includes a sequence of time-domain OFDM input symbols, with each OFDM input symbol comprising a vector (or sequence) of time-domain samples. (The samples may be complex-valued samples, with each sample including an inphase component and a quadrature component.) The OFDM input signal is derived from a baseband signal produced by a receiver (e.g., a high quality receiver in an RF signal analyzer) in response to a transmission of an analog OFDM signal (e.g, an RF OFDM signal) from the device under test. The device under test may transmit the analog OFDM signal onto a transmission medium. The receiver may receive the analog OFDM signal from the transmission medium, and generate the baseband signal by well known processes such as amplification, filtering, downconversion and analog-to-digital conversion. In some embodiments, the OFDM input signal may be the result of a series of one or more correction operations applied to the baseband signal, e.g., as described further below.

At 115, the digital circuitry may access a reference signal from the memory. The reference signal includes a sequence of time-domain OFDM reference symbols. Each of the OFDM reference symbols comprises a vector of time-domain samples. (Each of the OFDM reference symbols may represent an estimate of a corresponding one of the OFDM transmit symbols transmitted by the device unit test.) The reference signal may be derived from the above-described baseband signal by means well known in the art of signal processing. In some embodiments, the reference signal may be derived from the baseband signal using any of the methods disclosed in U.S. patent application Ser. No. 13/567,928, filed on Aug. 6, 2012, entitled "Unit Testing and Analysis Using a Stored Reference Signal", invented by Craig E. Rupp, Gerardo Orozco Valdes, I. Zakir Ahmed, and Vijaya Yajnanarayana, which is hereby incorporated by reference in its entirety as though fully and completely set forth herein.

At 120, the digital circuitry may compute a first error vector magnitude (EVM) in the time domain. The first EVM is computed based on a time-domain difference signal, wherein the time-domain difference signal is a time-domain difference between the sequence of time-domain OFDM input symbols and the sequence of time-domain OFDM reference symbols. The first EVM may be determined without transforming the sequence of time-domain OFDM input symbols to the frequency domain. (Thus, the present method may operate more efficiently than conventional EVM computations.) The first EVM may be related to a standard-defined composite EVM by a scalar multiple, e.g., as described below. The standard-defined composite EVM may be an error vector magnitude defined by any OFDM-based communication standard, e.g., a communication standard such as one of the following: 3GPP Long Term Evolution, IEEE 802.11, IEEE 802.16, IEEE 802.20, DVB, DVB-T, ISDB-T, CMMB. (DVB is an acronym for "Digital Video Broadcasting". DVB-T is an acronym for "Digital Video Broadcasting—Terrestrial". ISDB-T is an acronym for "Integrated Services Digital Broadcast—Terrestrial". CMMB is an acronym for "China Multimedia Broadcasting".)

At 125, the first EMV may be stored in memory.

As noted above, the receiver may be included an RF signal analyzer. In some embodiments, the above-described digital circuitry is part of the RF signal analyzer.

In some embodiments, the set of operations also includes displaying a visual representation of the first EVM using a display device, e.g., displaying the numeric value of the first EVM or a graph including the first EVM as a data point.

In some embodiments, the set of operations also includes declaring that the DUT (or the analog OFDM signal transmitted by the DUT) has passed or failed a quality test based on the first EVM.

In some embodiments, the first EVM is usable to evaluate the quality of the analog OFDM signal transmitted from the DUT. Small values of the first EVM indicate high quality whereas large values indicate poor quality.

In some embodiments, the above-mentioned scalar multiple (that relates the first EVM to the standard-defined composite EVM) is equal to the square root of M/N, where N is a number of subcarriers occurring in each of the time-domain OFDM input symbols, wherein M is a number of active subcarriers among the N subcarriers in each time-domain OFDM input symbol.

In some embodiments, the OFDM input signal may be derived from the baseband signal by performing one or more of the following operations. (These one or more operations may be performed by the receiver and/or by the above-described digital circuitry and/or by some other processing agent.)

A. Filtering: The baseband signal may be filtered in the time domain to obtain a filtered baseband signal. The filtering may be used to reduce the noise power outside the band of interest. The filtering may be performed as a first step in the receiver signal processing chain.

B. Symbol Timing Adjustment: The symbol timing of the baseband signal may be adjusted based on an estimated symbol timing error. The symbol timing error may be estimated using the reference signal, e.g., by employing any of various well known computational algorithms.

C. Frequency/Phase Correction: The phase and/or frequency of the baseband signal may be corrected based on a frequency error and/or a phase offset error of the baseband signal. The frequency error and/or the phase offset error may be estimated using the reference signal, e.g., by employing any of various well known computational algorithms.

D. DC Offset Corrections: Inphase (I) and Quadrature (Q) DC offset errors may be removed respectively from the I and Q components of the baseband signal. The DC offset errors may be estimated using the reference signal, e.g., by employing any of various well known computational algorithms.

In some embodiments, channel equalization may be performed on the baseband signal to compensate for distortions introduced by the transmission channel between the device under test and the receiver. The channel equalization may be performed, e.g., by employing any of various well known computational algorithms.

In one embodiment, the action of computing the first EVM may include: (1) computing the above-described time-domain difference signal by subtracting each of the time-domain reference OFDM symbols from a respective one of the time-domain OFDM input symbols to obtain a respective time-domain difference vector including a respective sequence of difference samples; (2) computing a time-domain average of sample power in the time-domain difference signal based on the time-domain difference vectors; and (3) computing a square root of the time-domain average. (See, e.g., equation (11) below.) This embodiment may be used in contexts where the average sample power of the reference signal, e.g., the denominator of equation (11), has been normalized to unity.

In an alternative embodiment, the average sample power of the reference signal has not been previously normalized. Thus, the action of computing the first EVM may include: (1*) computing the time-domain difference signal by subtracting each of the time-domain reference OFDM symbols from a respective one of the time-domain OFDM input symbols to obtain a respective time-domain difference vector including a respective sequence of difference samples; (2*) computing a first time-domain average of sample power in the time-domain difference signal based on the time-domain difference vectors; (3*) computing a second time-domain average of sample power in samples of the time-domain reference OFDM symbols; (4*) computing a ratio between the first time-domain average and the second time domain average; and (5*) computing a square root of the ratio. See, e.g., equation (11) and the corresponding discussion.

In some embodiments, the method 100 also includes computing the standard-defined composite EVM from the first EVM using the scalar multiple (e.g., by dividing the first EVM by the scalar multiple, or by multiplying the first EVM by the reciprocal of the scalar multiple.) The standard-defined composite EVM may be stored in memory. For example, the standard-defined composite EVM may be stored together with information identifying the DUT, e.g., the serial number of the DUT.

In some embodiments, the operations 110, 115 and 120 may be repeated a plurality of times to obtain a respective plurality of values of the first EVM. The plurality of values may be averaged to obtain an average EVM. The average EVM may be stored memory, and used, e.g., to evaluate the quality of the analog OFDM signal transmitted by the DUT. Other statistics such as standard deviation of the first EVM may also be computed.

Figure 1B:
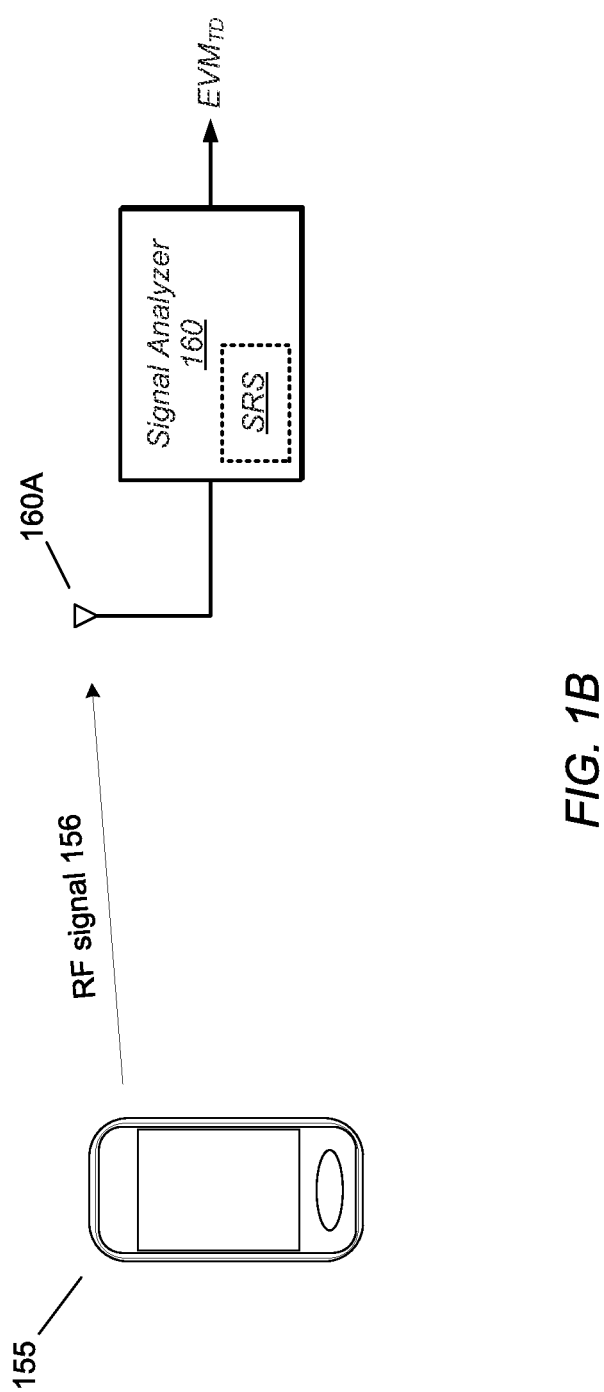
FIG. 1B shows one possible scenario for testing a mobile device 155, wherein the mobile device 155 transmits an OFDM-carrying RF signal 156 to the signal analyzer 160.

FIG. 1B shows one possible scenario for testing a mobile device 155. The mobile device transmits an OFDM-carrying RF signal 156 to the signal analyzer 160. The signal analyzer 160 receives the RF signal, e.g., via an antenna 160A (or a set of antennas), and produces a sampled baseband signal based on the received RF signal. The signal analyzer or some other processing device may compute a time-domain error vector magnitude ($EVM_{TD}$) using the sampled baseband signal and the stored reference signal SRS as described above.

TECHNICAL REFERENCES MENTIONED IN THIS PATENT DISCLOSURE

[1] R. Schmogrow et al., "Error Vector Magnitude as a Performance Measure for Advanced Modulation Formats", IEEE Letters on Photonics Technology, Volume 24, Issue 1, Jan. 1, 2012.

[2] Xiaowen Li et al., "A Novel Measurement of Error Vector Magnitude for TD-LTE Termination", 5th International Congress on Image and Signal Processing (CISP), October 2012.

[3] 3GPP TS 36.141 V8.3.0, "Evolved Universal Terrestrial Radio Access; Base Station (BS) Conformance Testing" (Release 8), July 2007.

[4] 3GPP TS 36.521-1 V8.0.1, "Evolved Universal Terrestrial Radio Access; User Equipment (UE) Conformance Specification; Radio Transmission and Reception; Part 1: Conformance Testing" (Release 8), January 2009.

[5] U.S. patent application Ser. No. 13/567,928, filed on Aug. 6, 2012 (published as U.S. Publication No. 2014/0040668 on Feb. 6, 2014), entitled "Unit Testing and Analysis Using a Stored Reference Signal", invented by Craig E. Rupp, Gerardo Orozco Valdes, I. Zakir Ahmed, and Vijaya Yajnanarayana.

[6] Internet Web Page entitled "NI PXIe-5673E 6.6 GHz Vector Signal Generator With RF List Mode", located at: http://sine.ni.com/nips/cds/view/p/lang/en/nid/207905.

[7] Internet Web Page entitled "NI PXIe-5663 6.6 GHz Vector Signal Analyzer", located at: http://sine.ni.com/nips/cds/view/p/lang/en/nid/205592.

Time Domain Method for Computing Error Vector Magnitude of OFDM Signals

In measurements involving the computation of error vector magnitude (EVM) for OFDM signals, a partial receiver involving the following steps may be implemented as part of the receive chain: symbol timing recovery, carrier frequency and phase offset correction, inphase (I) and quadrature (Q) DC offset removal, FFT computation, channel equalization, reference signal generation and EVM computation [1], [2]. (The OFDM signal may be an LTE signal, a WiMAX signal, a WiFi signal, a television signal, a radio signal, etc.)

The computation of the FFT or IFFT consumes a significant amount of processing time. In this patent disclosure, we describe a technique to compute the EVM in the time domain using a reference signal which has been previously determined and stored. This technique does not require computation of the FFT or IFFT. We show that the time-domain EVM computed using the present technique matches the EVM defined in one or more standards (e.g., see [3] and [4]) by a factor of $$\sqrt{\frac{M}{N}}:$$

$$EVM_{Standard} = (M/N)^{1/2} EVM_{TD},$$

where M is the number of active subcarriers per OFDM symbol, and N is the total number of sub carriers per OFDM symbol.

Introduction: EVM is a metric that is very commonly used across the Test and Measurement industry to evaluate the quality of a transmitted signal (e.g., a signal transmitted or produced by a device under test such as a mobile device or a power-translating device). This metric is used as a figure of merit for many RF product component verification and validation tests. It is also extensively used as a parameter to be evaluated for many of the tests of wireless standard conformance [3], [4]. Considering the fact that EVM needs to be evaluated in the production floor testing of RF components and mobile devices, it becomes important that this measurement be performed in a short period of time.

In this patent disclosure, we introduce a time domain based composite EVM measurement technique for OFDM signals. The present technique may use a stored reference signal. For details pertaining to use of stored reference signals in test systems, please refer to U.S. patent application Ser. No. 13/567,928 filed on Aug. 6, 2012 (entitled "Unit Testing and Analysis Using a Stored Reference Signal", invented by Craig E. Rupp, Gerardo Orozco Valdes, I. Zakir Ahmed, and Vijaya Yajnanarayana). The presently-disclosed EVM computation technique produces an EVM that matches the standard-defined EVM computed by the traditional technique, but reduces the computation time considerably, e.g., in range of a factor of 2 to 3.

Signal Model

The received baseband signal model $r_l(n)$ for an OFDM signal (e.g., an LTE downlink signal) can be written as:

$$r_l(n) = x_l(n)e^{-j[\Delta\omega(n-n_0)+\phi]} + ae^{j\beta} + w_l(n), \quad (1)$$

where $x_l(n)$ represents the time-domain version of the transmitted baseband signal:

$$x_l(n) = \frac{1}{N} \sum_{K=0}^{N-1} X_l(K)\exp\left(\frac{j2\pi nK}{N}\right), \quad (2)$$

where
 l=OFDM symbol index;
 n=Sample index in time domain;
 K=Subcarrier index;
 $X_l(K)$=Kth Subcarrier of lth OFDM symbol of transmitted baseband signal;
 N=Total number of Subcarriers;
 Δω=Frequency offset in radians per sample;
 φ=Phase offset in radians;
 α=Magnitude of the IQ-DC offset;
 β=Angle error of the IQ-DC offset;
 $n_0$=Timing ambiguity in the received signal;
 $w_l(n)$=Additive White Gaussian Noise (AWGN) in the channel.

We are interested in computing the EVM of the received baseband signal over L OFDM symbols. FIG. 2 depicts a method of computing the subcarrier error vector magnitude evm(K) and the composite error vector magnitude cemv. (In some technical sources such as [3] and [4], the composite EVM is referred to simply as "the EVM".) FIG. 2 uses the following notation:
 r(n)=received baseband signal;
 r'(n)=corrected version of r(n) after removal of timing error, removal of frequency and phase errors, and removal of IQ DC offset error;
 R'(K)=FFT {r'(n)};
 X̂(K)=frequency-domain reference symbol for subcarrier K;
 evm(K)=EVM for subcarrier K;
 cevm=composite EMV.

As shown in FIG. 2, filter 210 filters the received baseband signal r(n) to obtain a filtered signal $r_F(n)$. Unit 215 performs symbol timing recovery on the filtered signal $r_F(n)$ to obtain a signal $r_{TR}(n)$. Unit 220 performs coarse frequency offset and phase error correction on the signal $r_{TR}(n)$ to obtain the corrected signal r'(n). Unit 225 performs an N-point Discrete Fourier Transform (e.g., FFT) on the corrected signal r' to obtain the frequency-domain signal R'. Unit 230 performs hard decision demodulation on the sub-carriers R'(K) of the frequency-domain signal R' to obtain corresponding subcarriers X̂(K) of the frequency-domain reference signal X̂. The EVM computation block 235 computes the subcarrier evm(K) for each subcarrier K, and computes the composite EVM cevm.

FIG. 3 illustrates an RF component test setup for component validation and/or characterization and/or evaluation. The signal generator 310 may generate a baseband signal x(n), e.g., based on digital data supplied by a test control program. The signal generator may then produce an RF test signal $x_{RF}(t)$ based on the baseband signal x(n), and supply the RF test signal to the device under test (DUT) 315, e.g., through a wireless channel or a wired channel. The DUT (e.g., a mobile device or RF power-translating device) may generate an RF signal $y_{RF}(t)$ in response to receiving the RF test signal $x_{RF}(t)$, and transmit the RF signal $y_{RF}(t)$ to the signal analyzer 320 through a transmission medium, e.g., a wired medium or a wireless medium. The signal analyzer may receive the RF signal $y_{RF}(t)$, down convert the RF signal $y_{RF}(t)$ to an analog baseband signal, and then digitize the analog baseband signal to obtain the sampled baseband signal r(n). In some embodiments, the DUT 315 may generate the baseband signal x(n) itself, and thus, the signal generator 310 may be omitted.

The signal analyzer 320 operates on the sampled baseband signal r(n) and the stored reference signal x̂(n) to obtain the subcarrier EVM evm(K) for each subcarrier K and the composite EVM cevm. The reference signal may be stored in the signal analyzer 320 (as implied at item 321) or external to the signal analyzer. For more information on the generation and storage and use of reference signals in test and measurement systems, see U.S. patent application Ser. No. 13/567,928 filed on Aug. 6, 2012 (published as U.S. Publication No. 2014/0040668).

In some embodiments, the reference signal x̂(n) may be derived from the sampled baseband signal r(n) or the corrected baseband signal r'(n) by any of various techniques, e.g., by hard decision demodulation as described above. In other embodiments, the signal generator 310 or test controller may supply the original baseband signal x(n) to the signal analyzer 320, and thus, the signal analyzer may use the original baseband signal x(n) as the reference signal x̂(n).

Since we assume the time-domain reference signal x̂(n) is supplied as an input, the FFT computation block 225 and hard decision demodulation block 230 of FIG. 2 may be omitted, and a composite EVM $cevm_{TD}$ of the received signal $r_l(n)$ may be directly computed in the time-domain, e.g., as shown in FIG. 4. (The subscript "l" denotes the OFDM symbol index.) The composite EVM $cevm_{TD}$ may be computed for duration of L OFDM symbols. In some embodiments, the value of L may be user programmable.

As shown in FIG. 4, the unit 410 may filter the received baseband signal r(n) to obtain a filtered signal $r_F(n)$. (This is typically done to suppress the noise out of the signal band of interest.) Unit 415 may perform fine time alignment on the filtered signal $r_F(n)$ to obtain an aligned signal $r_A(n)$. Unit 420 may perform one or more of all of the following operations on the aligned signal $r_A(n)$ to obtain a corrected signal r'(n): remove fine frequency offset, remove phase offset, and remove IQ DC offset.

Each of units 415, 420 and 430 may use the time domain reference signal x̂(n). For example, fine time alignment unit 415 may use the reference signal to estimate a time offset of the filtered signal $r_F(n)$. Correction unit 420 may use the reference signal to estimate frequency offset and/or phase offset and/or IQ DC offset of the aligned signal $r_A(n)$.

The EVM computation block 430 computes the time-domain composite EVM $cevm_{TD}$ using the time-domain corrected signal r'(n) and the time-domain reference signal $\hat{x}(n)$, e.g., as variously described above in connection with FIG. 1 or as variously described below. The value $cevm_{TD}$ will differ numerically from the composite EVM defined in [3] and [4]. By examining the definition of cevm as given in [3] and [4], and by mathematically analyzing both the traditional approach of computing the cevm and the presently-disclosed approach for computing $cemv_{TD}$, we will establish a relation between the two composite EVMs. We will first examine the process of evaluating the composite EVM for the traditional approach and later do the same for the present approach.

The standard definitions for the EVM of subcarrier K, denoted evm(K), and the composite EVM, denoted cevm, are given by:

$$evm(K) = \sqrt{\frac{\frac{1}{L}\sum_{l=0}^{L-1} |R_l(K) - X_l(K)|^2}{\frac{1}{L}\sum_{l=0}^{L-1} |X_l(K)|^2}} \quad (3)$$

$$cevm = \sqrt{\frac{\frac{1}{L}\sum_{l=0}^{L-1}\sum_{K=0}^{M-1} |R_l(K) - X_l(K)|^2}{\frac{1}{L}\sum_{l=0}^{L-1}\sum_{K=0}^{M-1} |X_l(K)|^2}} \quad (4)$$

where $r_l(n) \overset{\mathcal{F}}{\Leftrightarrow} R_l(K)$ $x_l(n) \overset{\mathcal{F}}{\Leftrightarrow} X_l(K).$ L is the number of OFDM symbols in time over which cevm and evm(K) are evaluated. M is the total number of active subcarriers per OFDM symbol. The script "F" denotes the Fourier transform operator.

The following assumptions may be used in the derivation below. It should be understood, however, that a wide variety of other sets of assumptions may be used.

(a) The channel is non-dispersive and strictly AWGN. (AWGN is an acronym for "additive white Gaussian noise".)

(b) The synchronization, estimation and correction errors arising due to symbol timing recovery, carrier frequency offset estimation and phase offset estimation are considered negligible for the purpose of our discussion.

Using the assumptions (a) and (b), and after operating on the received baseband signal $r_l(n)$ to remove timing error, remove frequency and phase errors, remove IQ-DC offsets and perform equalization, the equation (1) above can be rewritten as:

$r_l'(n) = x_l(n) + w_l(n)$ \quad (1b)

Thus, after the FFT computation $R_l'(K) = X_l(K) + W_l(K).$

If hard decision demodulation were used to generate the reference signal, the reference subcarrier symbol $\hat{X}_l(K)$ would by definition be the result of mapping the subcarrier symbol $R_l'(K)$ to the closest point in the constellation used by the $K^{th}$ subcarrier. However, if the noise $W_l(K)$ is sufficiently small (which is true in most test and measurement applications), the hard decision demodulation would map the subcarrier symbol $R_l'(K)$ to truth, i.e., to the original subcarrier symbol $X_l(K)$. Substituting this into the standardized expressions for evm(K) and cevm above, we obtain:

$$evm(K) = \sqrt{\frac{\frac{1}{L}\sum_{l=0}^{L-1} |W_l(K)|^2}{\frac{1}{L}\sum_{l=0}^{L-1} |X_l(K)|^2}} \quad (5a)$$

$$cevm = \sqrt{\frac{\frac{1}{L}\sum_{l=0}^{L-1}\sum_{K=0}^{M-1} |W_l(K)|^2}{\frac{1}{L}\sum_{l=0}^{L-1}\sum_{K=0}^{M-1} |X_l(K)|^2}}. \quad (5b)$$

$|W_l(K)|^2$ is the noise power spectral density per sub carrier. Let $$\frac{N_0}{2}$$

be the power spectral density defined as power per Hz.

Knowing that the subcarrier spacing is $2\pi/N$, it can be seen that:

$$|W_l(K)|^2 = \frac{\pi N_0}{N} \text{ per subcarrier}. \quad (6)$$

Substituting equation (6) into equations (5a) and (5b), and performing some simple mathematical manipulation, we arrive at $$evm(K) = \sqrt{\frac{\pi N_0}{N P_{ref}(K)}} \quad (7a)$$

$$cevm = \sqrt{\frac{M \pi N_0}{N P_T}}, \quad (7b)$$

where $$P_{ref}(K) = \frac{1}{L}\sum_{l=0}^{L-1} |X_l(K)|^2, \quad (8)$$

where $$P_T = \frac{1}{L}\sum_{l=0}^{L-1}\sum_{K=0}^{M-1} |X_l(K)|^2 \quad (9)$$

$$= \frac{1}{L}\sum_{l=0}^{L-1}\sum_{K=0}^{N-1} |X_l(K)|^2.$$

Note that the inner index for $P_T$ is changed from M to N. This is because the power in the inactive subcarriers of an OFDM symbol are considered to be zero.

Time-Domain Expression for Composite EVM

Using the time-domain corrected signal $r_l'(n)$ and the stored time-domain reference signal, we can define the time-domain composite EVM $cevm_{TD}$ as:

$$cevm_{TD} = \sqrt{\frac{\frac{1}{L}\sum_{l=0}^{L-1}\frac{1}{N}\sum_{n=0}^{N-1}|r'_l(n)-x_l(n)|^2}{\frac{1}{L}\sum_{l=0}^{L-1}\frac{1}{N}\sum_{n=0}^{N-1}|x_l(n)|^2}}. \quad (10)$$

If we substitute $w_l(n)=r'_l(n)-x_l(n)$, equation (10) can be re-written as:

$$cevm_{TD} = \sqrt{\frac{\frac{1}{L}\sum_{l=0}^{L-1}\frac{1}{N}\sum_{n=0}^{N-1}|w_l(n)|^2}{\frac{1}{L}\sum_{l=0}^{L-1}\frac{1}{N}\sum_{n=0}^{N-1}|x_l(n)|^2}}. \quad (11)$$

By using the Parseval's identity and some basic math, we can write (11) as:

$$cevm_{TD} = \sqrt{\frac{\pi N_0}{P_T}} \quad (12)$$

where $$P_T = \frac{1}{L}\sum_{l=0}^{L-1}\sum_{K=0}^{N-1}|X_l(K)|^2 \quad (13)$$

Note that $P_T$ is the same as in equation (9).

It is worth noting that due to Parseval's theorem and the fact that the noise resembles AWGN, the error signal in the proposed time-domain method equals that in the frequency domain.

Results

Note that cevm of the traditional method can be obtained by multiplying the time-domain $cevm_{TD}$ by a factor of $$\sqrt{\frac{M}{N}}.$$

In other words, $$cevm = \sqrt{\frac{M}{N}}\, cevm_{TD}.$$

This analysis can be extended to the uplink signals (e.g., LTE uplink signals) as well. An experimental setup similar to FIG. 2 above was used for running various experiments and obtaining the results. The signal generator used was a National Instruments Vector Signal Generator "NI-PXIE 5673E" [6], and the signal analyzer used was a National Instruments Vector Signal Analyzer "NI-PXI 5663" [7]. An LTE EVM measurement module implementing the traditional approach and the present time-domain approach was run on this setup using the signal acquired by the NI-PXI 5663. There was no DUT (device under test) used in between.

The tests were nm by adding AWGN to an LTE signal (with SNR ranging from 35 dB to 60 dB in steps of 0.25 dB). The composite EVM for traditional approach and the proposed approach were computed for three different signal bandwidth configurations (20 Mhz, 15 Mhz and 10 Mhz). Table 1 in FIG. 6 gives a summary of the average cevm/ $cevm_{TD}$ ratios for three different signal configurations as stated above. This is compared with the expected ratio $$\sqrt{\frac{M}{N}}.$$

Figure 5A:
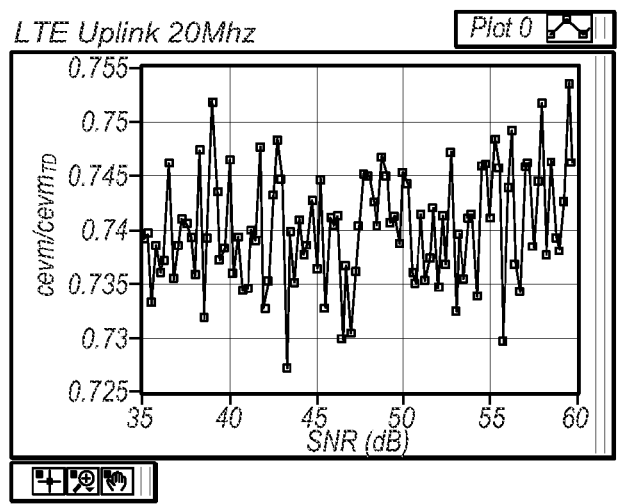
FIGS. 5A, 5B and 5C plot the ratio of a standard-defined composite EVM (cevm) to the time-domain composite EVM ($cevm_{TD}$) for LTE uplink signal with 20 MHz, 15 MHz and 10 MHz bandwidth configurations, respectively.
Figure 5B:
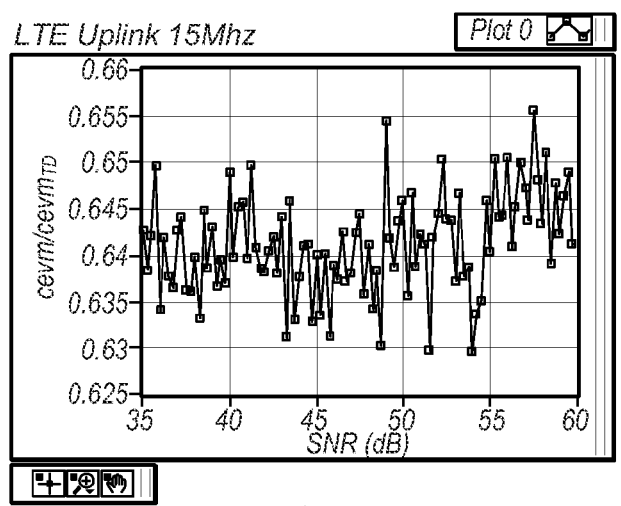
Figure 5C:
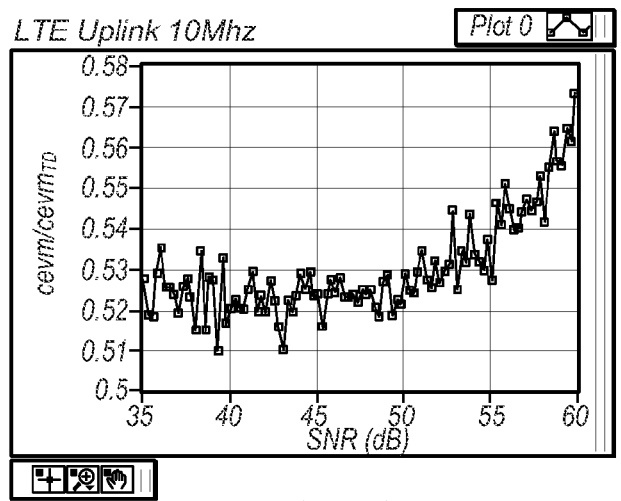

From FIGS. 5A, 5B and 5C and Table 1, note that the ratio of $cevm/cevm_{TD}$ is always nearly $$\sqrt{\frac{M}{N}}$$

for SNRs between 35 dB and 60 dB. The ratio of time consumed by traditional approach and the proposed approach is shown by Table 2 (see FIG. 8) which clearly shows that the proposed method is nearly 17 times faster than the traditional technique.

In conclusion, an efficient method of EVM computation using a stored time-domain reference signal is disclosed. This setup can be used for measuring the characteristics of RF components, as well as for production floor validation tests on the same. The EVM computed using the disclosed method is shown to match the EVM as defined in the LTE standards [3] and [4] up to an easily-computed multiplicative factor. The analytical results are substantiated by tests performed using simulations and hardware.

Computer System

Figure 8:
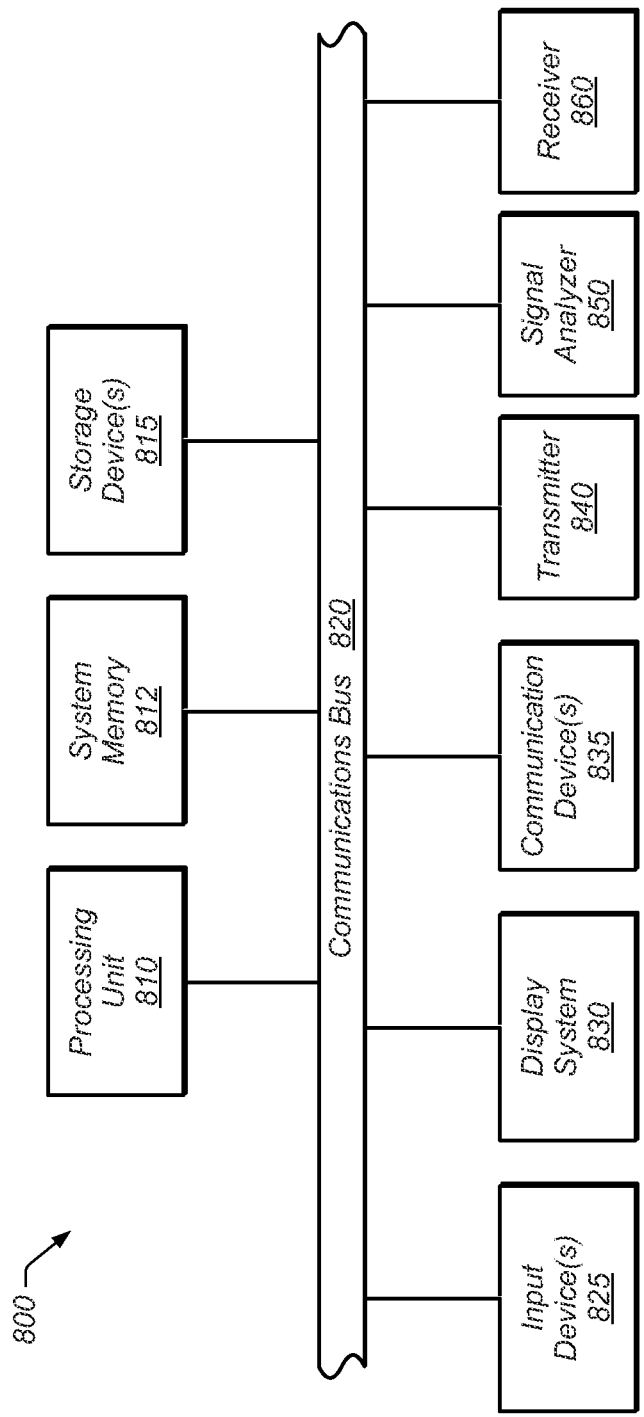
FIG. 8 illustrates one embodiment of a computer system 800 that may be used to perform any of the method embodiments described herein.

FIG. 8 illustrates one embodiment of a computer system 800 that may be used to perform any of the method embodiments described herein, or, any combination of the method embodiments described herein, or any subset of any of the method embodiments described herein, or, any combination of such subsets.

Computer system 800 may include a processing unit 810, a system memory 812, a set 815 of one or more storage devices, a communication bus 820, a set 825 of input devices, and a display system 830.

System memory 812 may include a set of semiconductor devices such as RAM devices (and perhaps also a set of ROM devices).

Storage devices 815 may include any of various storage devices such as one or more memory media and/or memory access devices. For example, storage devices 815 may include devices such as a CD/DVD-ROM drive, a hard disk, a magnetic disk drive, magnetic tape drives, etc.

Processing unit 810 is configured to read and execute program instructions, e.g., program instructions stored in system memory 812 and/or on one or more of the storage devices 815. Processing unit 810 may couple to system memory 812 through communication bus 820 (or through a system of interconnected busses, or through a network). The program instructions configure the computer system 800 to implement a method, e.g., any of the method embodiments described herein, or, any combination of the method embodiments described herein, or, any subset of any of the method embodiments described herein, or any combination of such subsets.

Processing unit 810 may include one or more processors (e.g., microprocessors).

One or more users may supply input to the computer system 800 through the input devices 825. Input devices 825 may include devices such as a keyboard, a mouse, a touch-sensitive pad, a touch-sensitive screen, a drawing pad, a track ball, a light pen, a data glove, eye orientation and/or head orientation sensors, a microphone (or set of microphones), or any combination thereof.

The display system 830 may include any of a wide variety of display devices representing any of a wide variety of display technologies. For example, the display system may be a computer monitor, a head-mounted display, a projector system, a volumetric display, or a combination thereof. In some embodiments, the display system may include a plurality of display devices. In one embodiment, the display system may include a printer and/or a plotter.

In some embodiments, the computer system 800 may include other devices, e.g., devices such as one or more graphics accelerators, one or more speakers, a sound card, a video camera and a video card, a data acquisition system.

In some embodiments, computer system 800 may include one or more communication devices 835, e.g., a network interface card for interfacing with a computer network. As another example, the communication device 835 may include a specialized interface for communication via any of a variety of established communication standards or protocols (e.g., USB, Firewire, PCI, PCI Express, PXI).

The computer system may be configured with a software infrastructure including an operating system, and perhaps also, one or more graphics APIs (such as OpenGL®, Direct3D, Java 3D™). In some embodiments, the software infrastructure may include National Instruments LabVIEW™ software, and/or, LabVIEW™ FPGA.

In some embodiments, the computer system 800 may be configured to interface with transmitter 840 (e.g., a transmitter under test or an RF signal generator). The transmitter may be configured to generate a baseband signal including an I component signal and a Q component signal, and transmit an RF signal corresponding to the baseband signal. The transmitter may operate under the control of software executing on processor 810 and/or software executing on the transmitter itself.

In some embodiments, the computer system 800 may be configured to interface with an RF signal analyzer 850. The signal analyzer may be configured to perform any of various signal analysis operations on analog and/or digital signals. For example, the signal analyzer may receive an RF signal from a communication medium, e.g., in response to a transmission from the transmitter 840. The received RF signal may be downconverted and digitized to obtain a baseband signal including an I component signal and a Q component signal. The signal analyzer may operate under the control of software executing on processor 810 and/or software executing on the signal analyzer itself.

In some embodiments, the computer system 800 may be configured to interface with a receiver 860 (e.g., a receiver under test). The receiver 860 may be configured to receive an RF signal from a communication medium, e.g., in response to a transmission from an RF signal generator. The received RF signal may be downconverted and digitized to obtain a baseband signal including an I component signal and a Q component signal.

In some embodiments, the transmitter 840 and/or the signal analyzer 850 and/or the receiver 860 may include one or more programmable hardware elements and/or one or more microprocessors for performing digital processing on digital data (e.g., on digital baseband signals), e.g., as variously described herein.

Figure 9:
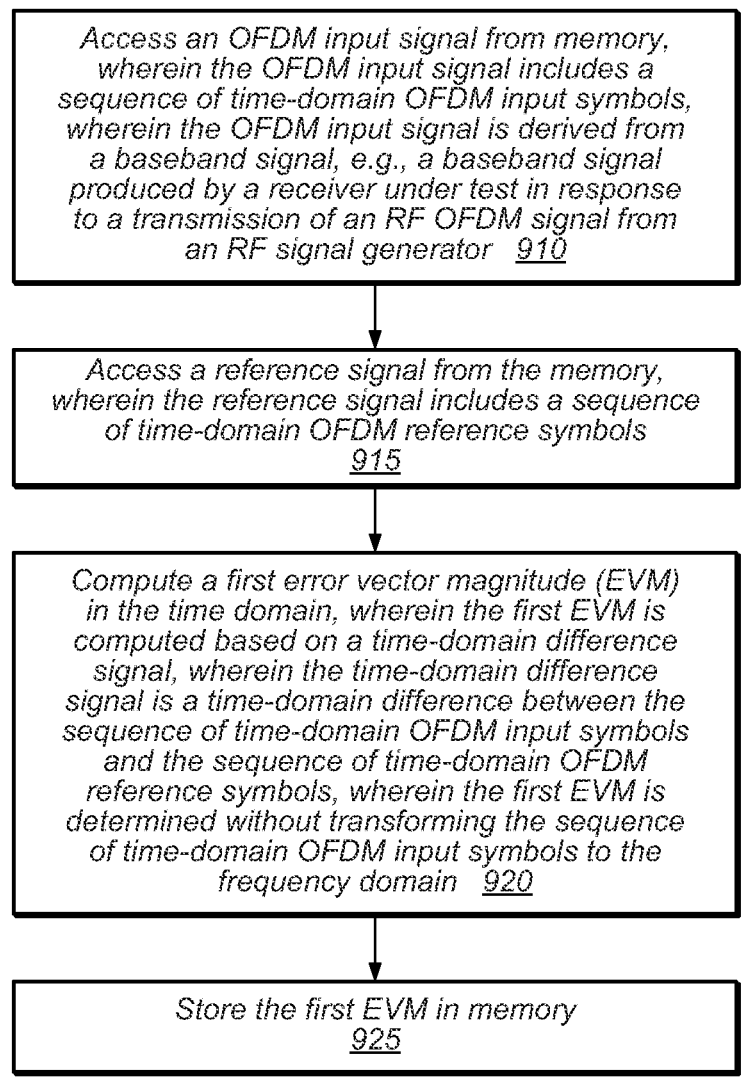
FIG. 9 illustrates one embodiment of a method 900 for computing a time-domain error vector magnitude for a receiver under test.

In one set of embodiments, a method 900 for efficiently computing error vector magnitude for a receiver under test may include the operations shown in FIG. 9. (The method 900 may also include any subset of the features, elements and embodiments described above in connection with FIGS. 3-8.) The method 900 may be performed by digital circuitry, e.g., by a processor in response to the execution of stored program instructions, by a programmable hardware element such as an FPGA, by dedicated circuitry such as an ASIC, or by any combination of the foregoing.

At 910, the digital circuitry may access an orthogonal frequency-division multiplexing (OFDM) input signal from memory. The OFDM input signal includes a sequence of time-domain OFDM input symbols, wherein the OFDM input signal is derived from a baseband signal, e.g., a baseband signal produced by a receiver under test in response to a transmission of an RF OFDM signal (i.e., an RF signal that carries OFDM) from an RF signal generator. The RF signal generator transmits the RF OFDM signal onto a transmission medium, and the receiver under test receives the RF OFDM signal from the transmission medium.

At 915, the digital circuitry may access a reference signal from the memory, wherein the reference signal includes a sequence of time-domain OFDM reference symbols. Each of the OFDM reference symbols comprises a vector of time-domain samples. (Each of the OFDM reference symbols may represent an estimate of a corresponding one of the OFDM transmit symbols transmitted by the signal generator.) The reference signal may be derived from the above-described baseband signal by means well known in the art of signal processing. In some embodiments, the reference signal may be derived from the baseband signal using any of the methods disclosed in U.S. patent application Ser. No. 13/567,928, filed on Aug. 6, 2012.

At 920, the digital circuitry may compute a first error vector magnitude (EVM) in the time domain, wherein the first EVM is computed based on a time-domain difference signal, wherein the time-domain difference signal is a time-domain difference between the sequence of time-domain OFDM input symbols and the sequence of time-domain OFDM reference symbols, wherein the first EVM is determined without transforming the sequence of time-domain OFDM input symbols to the frequency domain. The first EVM is related to a standard-defined composite EVM by a scalar multiple, e.g., as variously described above.

At 925, the digital circuitry may store the first EVM in memory.

Additional embodiments are described in the following numbered paragraphs.

1. A method comprising:

utilizing digital circuitry to perform a set of operations including:

(a) accessing an orthogonal frequency-division multiplexing (OFDM) input signal from memory, wherein the OFDM input signal includes a sequence of time-domain OFDM input symbols, wherein the OFDM input signal is derived from a baseband signal, e.g., a baseband signal produced by a receiver under test in response to a transmission of an RF OFDM signal from an RF signal generator;

(b) accessing a reference signal from the memory, wherein the reference signal includes a sequence of time-domain OFDM reference symbols;

(c) computing a first error vector magnitude (EVM) in the time domain, wherein the first EVM is computed based on a time-domain difference signal, wherein the time-domain difference signal is a time-domain difference between the sequence of time-domain OFDM input symbols and the sequence of time-domain OFDM reference symbols, wherein the first EVM is determined without transforming the sequence of time-domain OFDM input symbols to the frequency domain; and (d) storing the first EVM in memory.

2. The method of paragraph 1, wherein the set of operations also includes displaying a visual representation of the first EVM using a display device.

3. The method of paragraph 1, wherein the set of operations also includes declaring that the receiver under test has passed or failed a quality test based on the first EVM.

4. The method of paragraph 1, wherein the OFDM input signal is derived from the baseband signal by performing any non-empty subset of the actions in the following set of actions: filtering the baseband signal in the time domain to obtain a filtered baseband signal; adjusting symbol timing of the baseband signal based on a symbol timing error, wherein the symbol timing error is estimated using the reference signal; correcting the baseband signal based on a frequency error and/or a phase offset error of the baseband signal, wherein the frequency error and/or the phase offset error is estimated using the reference signal; removing I and Q DC offset errors respectively from I and Q components of the baseband signal, wherein the DC offset errors are estimated using the reference signal.

5. The method of paragraph 1, wherein said computing the first EVM includes: computing the time-domain difference signal by subtracting each of the time-domain reference OFDM symbols from a respective one of the time-domain OFDM input symbols to obtain a respective time-domain difference vector including a respective sequence of difference samples; computing a time-domain average of sample power in the time-domain difference signal based on the time-domain difference vectors; and computing a square root of the time-domain average.

6. The method of paragraph 1, wherein said computing the first EVM includes: computing the time-domain difference signal by subtracting each of the time-domain reference OFDM symbols from a respective one of the time-domain OFDM input symbols to obtain a respective time-domain difference vector including a respective sequence of difference samples; computing a first time-domain average of sample power in the time-domain difference signal based on the time-domain difference vectors; computing a second time-domain average of sample power in samples of the time-domain reference OFDM symbols; computing a ratio between the first time-domain average and the second time domain average; and computing a square root of the ratio.

7. The method of paragraph 1, wherein the signal generator is configured to transmit the RF OFDM signal as part of a procedure for testing the receiver under test.

8. The method of paragraph 1, wherein the first EVM is related to a standard-defined composite EVM by a scalar multiple.

9. The method of paragraph 8, wherein the scalar multiple is equal to the square root of M/N, where N is a number of subcarriers occurring in each of the time-domain OFDM input symbols, wherein M is a number of active subcarriers among the N subcarriers in each time-domain OFDM input symbol.

10. The method of paragraph 1, wherein the set of operations also includes: repeating (a), (b) and (c) a plurality of times to obtain a respective plurality of values of the first EVM; averaging the plurality of values of the first EVM to obtain an average EVM; and storing the average EVM in memory.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
utilizing digital circuitry to perform a set of operations including:
    (a) accessing an orthogonal frequency-division multiplexing (OFDM) input signal from memory, wherein the OFDM input signal includes a sequence of time-domain OFDM input symbols, wherein the OFDM input signal is derived from a baseband signal produced by an RF signal analyzer in response to a transmission of an RF OFDM signal from a device under test;
    (b) accessing a reference signal, wherein the reference signal includes a sequence of time-domain OFDM reference symbols;
    (c) computing a first error vector magnitude (EVM) in the time domain, wherein the first EVM is computed based on a time-domain difference signal, wherein the time-domain difference signal is a time-domain difference between the sequence of time-domain OFDM input symbols and the sequence of time-domain OFDM reference symbols, wherein the first EVM is determined without transforming the sequence of time-domain OFDM input symbols to the frequency domain, and wherein derivation of the OFDM input signal from the baseband signal does not include any transform to the frequency domain; and
    (d) storing the first EVM in memory.

2. The method of claim 1, wherein the set of operations also includes generating an estimate of a frequency-domain EVM of the input signal by multiplying the first EVM by a scaling factor.

3. The method of claim 1, wherein the set of operations also includes declaring that the RF OFDM signal transmitted from the device under test has passed or failed a quality test based on the first EVM.

4. The method of claim 1, wherein the OFDM input signal is derived from the baseband signal by performing at least one of:
filtering the baseband signal in the time domain to obtain a filtered baseband signal;
adjusting symbol timing of the baseband signal based on a symbol timing error, wherein the symbol timing error is estimated using the reference signal;
correcting the baseband signal based on a frequency error and/or a phase offset error of the baseband signal, wherein the frequency error and/or the phase offset error is estimated using the reference signal; and
removing I and Q DC offset errors respectively from I and Q components of the baseband signal, wherein the DC offset errors are estimated using the reference signal.

5. The method of claim 1, wherein said computing the first EVM includes:
computing the time-domain difference signal by subtracting each of the time-domain reference OFDM symbols from a respective one of the time-domain OFDM input symbols to obtain a respective time-domain difference vector including a respective sequence of difference samples;

computing a time-domain average of sample power in the time-domain difference signal based on the time-domain difference vectors; and computing a square root of the time-domain average.

6. The method of claim 1, wherein said computing the first EVM includes:

computing the time-domain difference signal by subtracting each of the time-domain reference OFDM symbols from a respective one of the time-domain OFDM input symbols to obtain a respective time-domain difference vector including a respective sequence of difference samples;

computing a first time-domain average of sample power in the time-domain difference signal based on the time-domain difference vectors;

computing a second time-domain average of sample power in samples of the time-domain reference OFDM symbols;

computing a ratio between the first time-domain average and the second time domain average; and computing a square root of the ratio.

7. The method of claim 1, wherein the device under test is configured to transmit the OFDM signal as part of a procedure for testing the RF OFDM signal transmitted from the device under test.

8. The method of claim 1, wherein the first EVM is related to a standard-defined composite EVM by a scalar multiple.

9. The method of claim 1, wherein the set of operations also includes:

repeating (a), (b) and (c) a plurality of times to obtain a respective plurality of values of the first EVM; and averaging the plurality of values of the first EVM to obtain an average EVM; and storing the average EVM in memory.

10. The method of claim 8, wherein the scalar multiple is equal to the square root of M/N, where N is a number of subcarriers occurring in each of the time-domain OFDM input symbols, wherein M is a number of active subcarriers among the N subcarriers in each time-domain OFDM input symbol.

11. A non-transitory memory medium storing program instructions, wherein the program instructions, when executed by a processor, cause the processor to implement a set of operations comprising:

(a) accessing an orthogonal frequency-division multiplexing (OFDM) input signal from memory, wherein the OFDM input signal includes a sequence of time-domain OFDM input symbols, wherein the OFDM input signal is derived from a baseband signal produced by an RF signal analyzer in response to a transmission of an RF OFDM signal from a device under test;

(b) accessing a reference signal, wherein the reference signal includes a sequence of time-domain OFDM reference symbols;

(c) computing a first error vector magnitude (EVM) in the time domain, wherein the first EVM is computed based on a time-domain difference signal, wherein the time-domain difference signal is a time-domain difference between the sequence of time-domain OFDM input symbols and the sequence of time-domain OFDM reference symbols, wherein the first EVM is determined without transforming the sequence of time-domain OFDM input symbols to the frequency domain, and wherein derivation of the OFDM input signal from the baseband signal does not include any transform to the frequency domain; and (d) storing the first EVM in memory.

12. The non-transitory memory medium of claim 11, wherein the set of operations also includes declaring that the RF OFDM signal transmitted from the device under test has passed or failed a quality test based on the first EVM.

13. The non-transitory memory medium of claim 11, wherein the first EVM is related to a standard-defined composite EVM by a scalar multiple.

14. The non-transitory memory medium of claim 11, wherein said computing the first EVM includes:

computing the time-domain difference signal by subtracting each of the time-domain reference OFDM symbols from a respective one of the time-domain OFDM input symbols to obtain a respective time-domain difference vector including a respective sequence of difference samples;

computing a time-domain average of sample power in the time-domain difference signal based on the time-domain difference vectors; and computing a square root of the time-domain average.

15. The non-transitory memory medium of claim 13, wherein the scalar multiple is equal to the square root of M/N, where N is a number of subcarriers occurring in each of the time-domain OFDM input symbols, wherein M is a number of active subcarriers among the N subcarriers in each time-domain OFDM input symbol.

16. A computer system comprising:

a processor; and memory storing program instructions, wherein the program instructions, when executed by the processor, cause the processor to implement a set of operations including:

(a) accessing an orthogonal frequency-division multiplexing (OFDM) input signal from memory, wherein the OFDM input signal includes a sequence of time-domain OFDM input symbols, wherein the OFDM input signal is derived from a baseband signal produced by an RF signal analyzer in response to a transmission of an RF OFDM signal from a device under test;

(b) accessing a reference signal, wherein the reference signal includes a sequence of time-domain OFDM reference symbols;

(c) computing a first error vector magnitude (EVM) in the time domain, wherein the first EVM is computed based on a time-domain difference signal, wherein the time-domain difference signal is a time-domain difference between the sequence of time-domain OFDM input symbols and the sequence of time-domain OFDM reference symbols, wherein the first EVM is determined without transforming the sequence of time-domain OFDM input symbols to the frequency domain, and wherein derivation of the OFDM input signal from the baseband signal does not include any transform to the frequency domain; and (d) storing the first EVM in memory.

17. The computer system of claim 16, wherein the set of operations also includes declaring that the RF OFDM signal transmitted from the device under test has passed or failed a quality test based on the first EVM.

18. The computer system of claim 16, wherein the first EVM is related to a standard-defined composite EVM by a scalar multiple.

19. The computer system of claim 16, wherein said computing the first EVM includes:

computing the time-domain difference signal by subtracting each of the time-domain reference OFDM symbols from a respective one of the time-domain OFDM input symbols to obtain a respective time-domain difference vector including a respective sequence of difference samples;

computing a time-domain average of sample power in the time-domain difference signal based on the time-domain difference vectors; and computing a square root of the time-domain average.

20. The computer system of claim 18, wherein the scalar multiple is equal to the square root of M/N, where N is a number of subcarriers occurring in each of the time-domain OFDM input symbols, wherein M is a number of active subcarriers among the N subcarriers in each time-domain OFDM input symbol.

* * * * *